United States Patent
Yu et al.

(10) Patent No.: US 10,855,724 B2
(45) Date of Patent: Dec. 1, 2020

(54) SECURELY ESTABLISHING KEY-BASED SSH COMMUNICATIONS BETWEEN VIRTUAL MACHINES DURING CLOUD MARKETPLACE PROVISIONING

(71) Applicant: EMC IP Holding Co. LLC, Hopkinton, MA (US)

(72) Inventors: Bin Yu, Sichuan (CN); Arthur Zhou, Chengdu (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 371 days.

(21) Appl. No.: 15/928,344

(22) Filed: Mar. 22, 2018

(65) Prior Publication Data

US 2019/0297112 A1    Sep. 26, 2019

(51) Int. Cl.
*H04L 29/06* (2006.01)
*H04L 9/08* (2006.01)
*G06F 9/445* (2018.01)

(52) U.S. Cl.
CPC .......... *H04L 63/18* (2013.01); *G06F 9/44505* (2013.01); *H04L 9/0825* (2013.01); *H04L 63/061* (2013.01); *H04L 63/083* (2013.01); *H04L 9/0819* (2013.01)

(58) Field of Classification Search
CPC ... H04L 9/0819; H04L 9/0822; H04L 9/0827; H04L 63/061
See application file for complete search history.

(56) References Cited

U.S. PATENT DOCUMENTS

| | | | |
|---|---|---|---|
| 10,423,774 B1* | 9/2019 | Zelenov | H04L 63/126 |
| 2015/0318986 A1* | 11/2015 | Novak | H04L 63/0428 |
| | | | 713/189 |
| 2015/0350188 A1* | 12/2015 | Gilpin | H04L 63/083 |
| | | | 726/9 |
| 2017/0026355 A1* | 1/2017 | Mathaiyan | G06F 9/5072 |
| 2019/0007382 A1* | 1/2019 | Nirwal | H04L 63/0442 |
| 2019/0116619 A1* | 4/2019 | Hauck | H04L 9/3273 |
| 2019/0222574 A1* | 7/2019 | Akbar | H04L 63/061 |

* cited by examiner

*Primary Examiner* — Daniel B Potratz
(74) *Attorney, Agent, or Firm* — Barry N. Young

(57) ABSTRACT

Virtual machines are launched in a public cloud software marketplace by a user purchasing a software product. The virtual machines are automatically provisioned and configured upon launching. One virtual machine generates a public/private key pair, and key-based SSH communications is securely established between the virtual machines without the necessity of insecurely transferring the private key over an insecure public communications channel.

14 Claims, 4 Drawing Sheets

SECURELY ESTABLISHING KEY-BASED SSH COMMUNICATIONS BETWEEN VIRTUAL MACHINES DURING CLOUD MARKETPLACE PROVISIONING

BACKGROUND

This invention relates generally to systems and methods for automatically and securely setting up key-based SSH communications in a public cloud environment, and more particularly to methods for securely transferring cryptographic keys between virtual machines in a public cloud to establish key-based SSH communications.

Today many software vendors are offering their software products in a public cloud marketplace, such as provided by Amazon Web Service ("AWS") and Microsoft Azure, as a SaaS (Software-as-a-Service) product. The software products typically provision and configure one or more virtual machines comprising virtual processors for executing the software, virtual memory and virtual storage running on one or more physical servers. The cloud vendors want to simplify their products' provisioning and configuring processes by minimizing the need for customer (user) interaction. In fact, the vendors wish to avoid the necessity for customers configuring their products after provisioning. Rather, they want zero configuration following provisioning—in effect they want simultaneous provisioning and configuration. Some cloud vendors such as AWS and Azure provide template-like processes, e.g., AWS Cloud Formation, or Azure Solution Template, that both launch VM instances as well as configure them at the same time. Provisioning normally requires launching multiple virtual machine ("VM") instances, and then configuring their operating systems, software and data, as by running scripts so that the VMs are ready for operations. Although the VMs communicate within a virtual private cloud, for authentication and security reasons secure communications between VM instances is important. Key-based Secure Shell ("SSH") systems use SSH key pairs to authenticate a client to a server, and provides a mechanism for establishing a cryptographically secured connection authenticating each side to the other, and passing commands and output back and forth. Key-based SSH is normally required over password-based SSH communications because public key authentication is more secure than password-based authentication. Password-based systems are easily broken. In contrast, key-based SSH, also referred to as "public key authentication systems" are computationally difficult to break, and provide strong host-to-host and user authentication as well as freeing users from having to remember complicated passwords.

However, there are significant problems as to how to securely configure key-based SSH communications during the provisioning process over an open network. Open networks, such as the Internet, are susceptible to a variety of security attacks, including interception of communications by unauthorized third parties. Key-based SSH uses key pairs comprising a public key and a private key to authenticate a client to a server. A sender encrypts a message intended for a receiver using the receiver's public key, and sends it to the receiver who decrypts the message using the receiver's private key. Without the receiver's private key, one who intercepts the message cannot decrypt it. Public keys are publicly known by many, but a private key is known only to the owner of the private key.

The templates provided by cloud vendors do not support generation of key pairs, and while a VM itself could generate the key pairs, it could not securely transfer the key to its communication partner. Communications security requires that password-based SSH be disabled because it is not very secure, and that private keys not be transferred over any communications channel. This creates problems in provisioning and configuring VMs in an open network cloud environment for key-based SSH since keys and configuration information must be transferred. Vendors do not want a customer to provide private keys to a partner by insecure methods, but customers and partners cannot communicate securely until an SSH channel has been established. Additionally, to satisfy the zero configuration objectives, vendors do not want customers to be required to copy public keys to VMs after provisioning.

It is desirable to provide systems and methods that address these and other problems of establishing secure communications for provisioning and configuring of VMs over open networks with little or no user involvement, and it is to these ends that the present invention is directed.

DESCRIPTION OF PREFERRED EMBODIMENTS

The invention provide systems and methods that address the foregoing and other problems of establishing secure communications for provisioning and configuring of VMs over open networks by securely establishing a key-based SSH communication channel between virtual machine instances during cloud provisioning without transferring the private key over network. The invention will be described in the context of a cloud-based software vendor environment. However, as will become apparent, this is illustrative of only one utility of the invention and that the invention has wider applicability to other contexts and environments.

Figure 1:
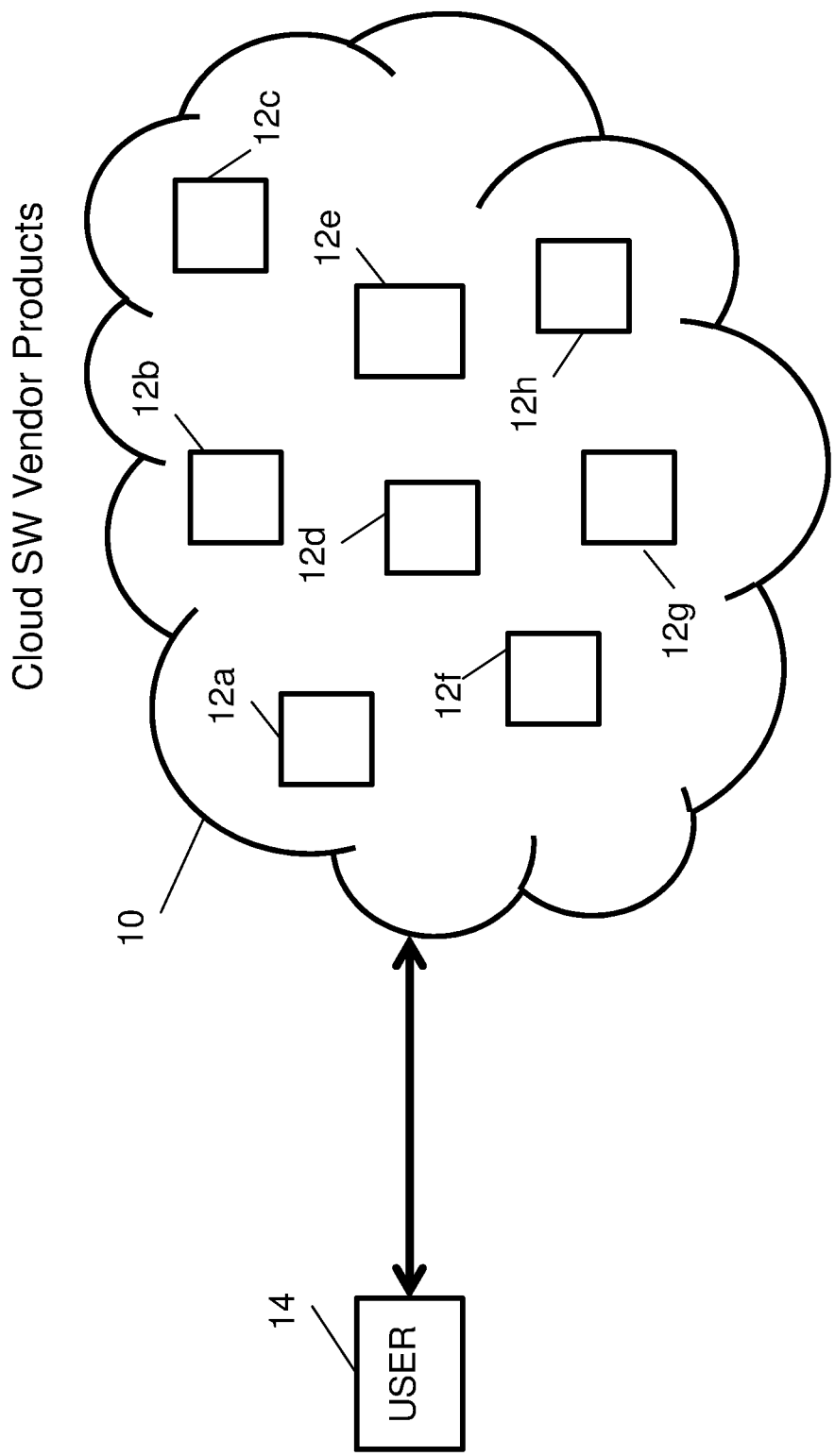
FIG. 1 is diagrammatic view illustrating one type of a cloud environment in which the invention may be employed.

FIG. 1 illustrates one type of public cloud marketplace environment 10 in which the invention—a public cloud software vendor environment. A cloud vendor such as Amazon AWS or Microsoft Azure may provide their product offerings 12a . . . 12i for purchase or license and use by a customer/user 14 in the cloud marketplace 10. Upon accessing the cloud marketplace, a list of the available software products may be viewed by the user. Upon the user purchasing a product, virtual machine (VM) instances may be launched and configured for the operation of the product.

Typically, the vendors provide a one-click process for provisioning and configuring a software product selected by the user. The provisioning process normally includes launching and configuring one or more instances of virtual machines, and vendors such as AWS and Azure provide template-like processes, e.g., AWS CloudFormation of Azure Solution Template, for service providers to use to perform launching and configuring of the multiple VM instances. Typically, these processes use Cloud-init or similar known technology to perform configuration of the instances. Cloud-init is a known service program comprising a set of utilities and scripts that runs on boot and handles the initialization and configuration of Linux VM instances. CloudBase-init is a similar service for Windows machines. The services run on the operating system starts early at boot, and retrieve metadata that has been provided from an external provider or obtained from a user to configure the machine instances.

Figure 2:
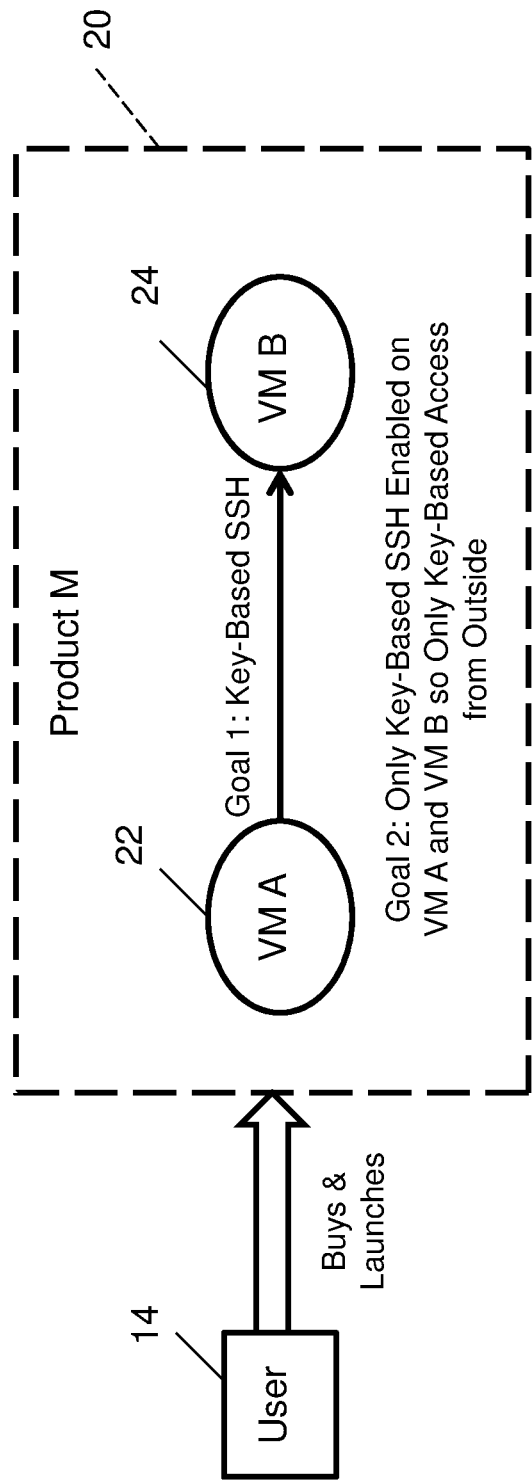
FIG. 2 is diagrammatic view illustrating a user/customer purchasing and launching a SW product from the cloud of FIG. 1.

FIG. 2 illustrates diagrammatically a process by which a user 14 buys and launches a product offering 20 ("Product M"). As shown in the figure, Product M may launch, provision and configure two virtual machines, VM A (22) and VM B (24), with a communications channel between them. Other products may launch and configure multiple virtual machines. To minimize the necessity of user involvement in these processes, the Product M may provide a template to AWS Cloud Formation and then use an AWS Cloud Formation console (or a Solution Template in Azure) to obtain metadata from the user. The template may employ a service utility (program) such as Cloud-init scripts to configure the two VMs when they are provisioned so that the product is ready for use after provisioning. As described previously, password-based communications between the two VMs in a cloud environment is insecure. Accordingly, Product M is preferably configured to meet two goals. First, it is desirable for the Product M to configure the VMs the communications channel between them is only the more secure key-based SSH communications, and, secondly, to configure the VMs for key-based SSH communications with outside systems and devices external to the Product M. While a VM may generate a public-private key pair, the problem is for a virtual machine to securely transfer a private key to its communications partner over an insecure communications channel to establish key-based SSH. As previously described, a private key may not be uploaded to or transmitted insecurely over a public or open channel, such as the Internet.

The invention affords a process and system that solve this problem by enabling secure SSH key exchange and configuration over an open network before a key-based SSH channel has been established. Moreover, the invention automatically provisions and configures a secure communications channel between VMs concurrently with launching the VMs, without the necessity of involvement of a user, so that secure communications can begin substantially immediately after launch.

Figure 3:
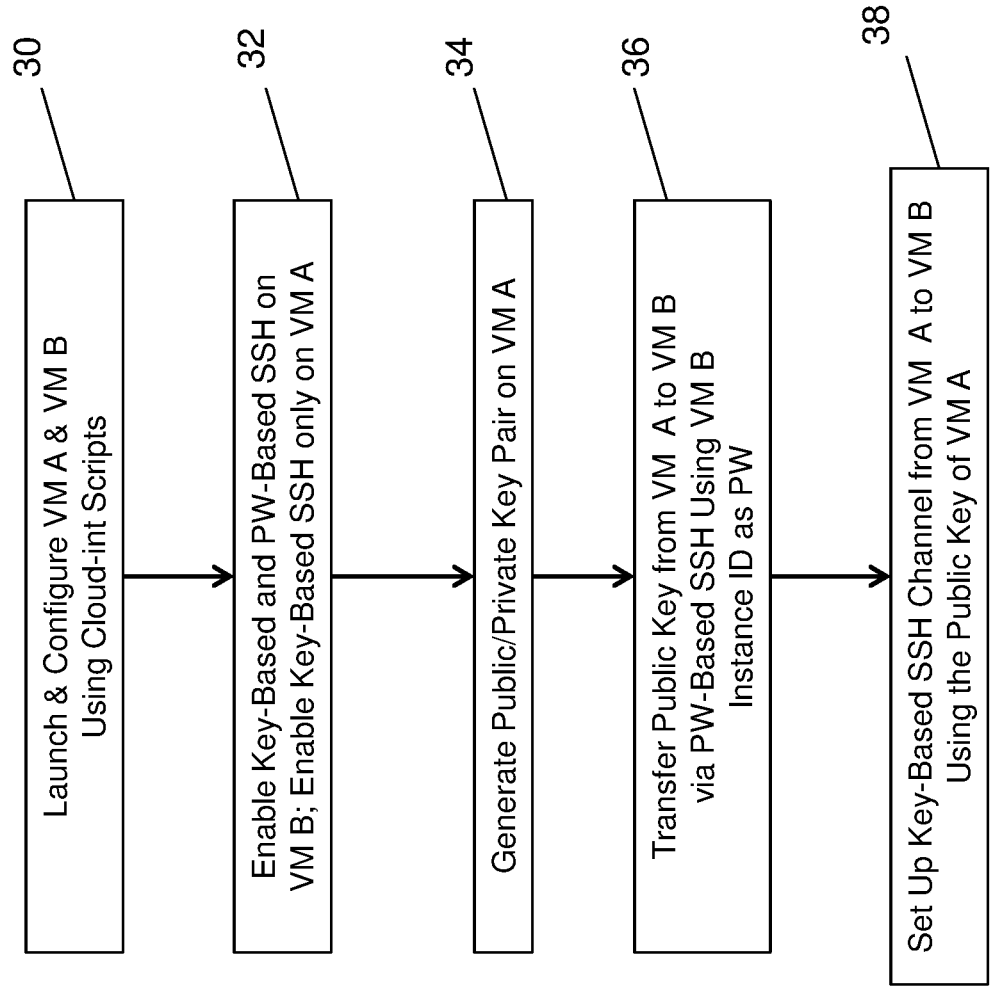
FIG. 3 is block diagram giving an overview of an embodiment of a process in accordance with the invention for securely establishing key-based SSH communications over an open network without transferring a private key over the open network.

FIG. 3 illustrates an overview of an embodiment of process in accordance with the invention for affording secure key exchange over an insecure communications channel. The invention will be described in the context of establishing a key-based SSH channel between VM A, 22, and VM B, 24, of Product M of FIG. 2 during provisioning and configuration. It will be appreciated, however, that this is illustrative of only one utility of the invention, and that the invention has greater applicability for secure key exchange in other contexts.

Referring to FIG. 3, at step 30, two virtual machines, VM A and VM B may be launched and initially configured using Cloud-init or similar utilities, as previously described. The process of FIG. 3 runs automatically to completion without user intervention. The Cloud-init mechanism affords a VM only one chance to perform its initial configuration immediately after launch. Cloud-init gives each VM instance, VM A and VM B, an instance identifier upon launch. Upon launch, at 32, both key-based SSH and password (PW)-based SSH are enabled on VM B, but only key-based SSH is enabled on VM A. Password-based SSH is only temporarily enabled on VM B during provisioning, using the instance ID of VM B as the default password for password-based SSH with VM B. The provisioning template may pass the instance ID of VM B to VM A as the default password for VM B.

At 34, a public/private key pair may be generated by VM A, and at 36 VM A's public key may be transferred from VM A to VM B via the password-based SSH channel to VM B established at step 32. This enables VM A to establish a key-based SSH communications channel to VM B at 38 using VM A's public key. Password-based SSH access to VM B may then be disabled. Since the password-based SSH channel to VM B is enabled only temporarily during initial provisioning and configuration, and is disabled after transferring VM A's public key to VM B, the risk of a security breach is very small. Once VM A establishes key-based SSH with VM B, VM B may generate its own public/private key pair and transfer its public key to VM A so that VM B may establish a key-based SSH channel to VM A.

Figure 4:
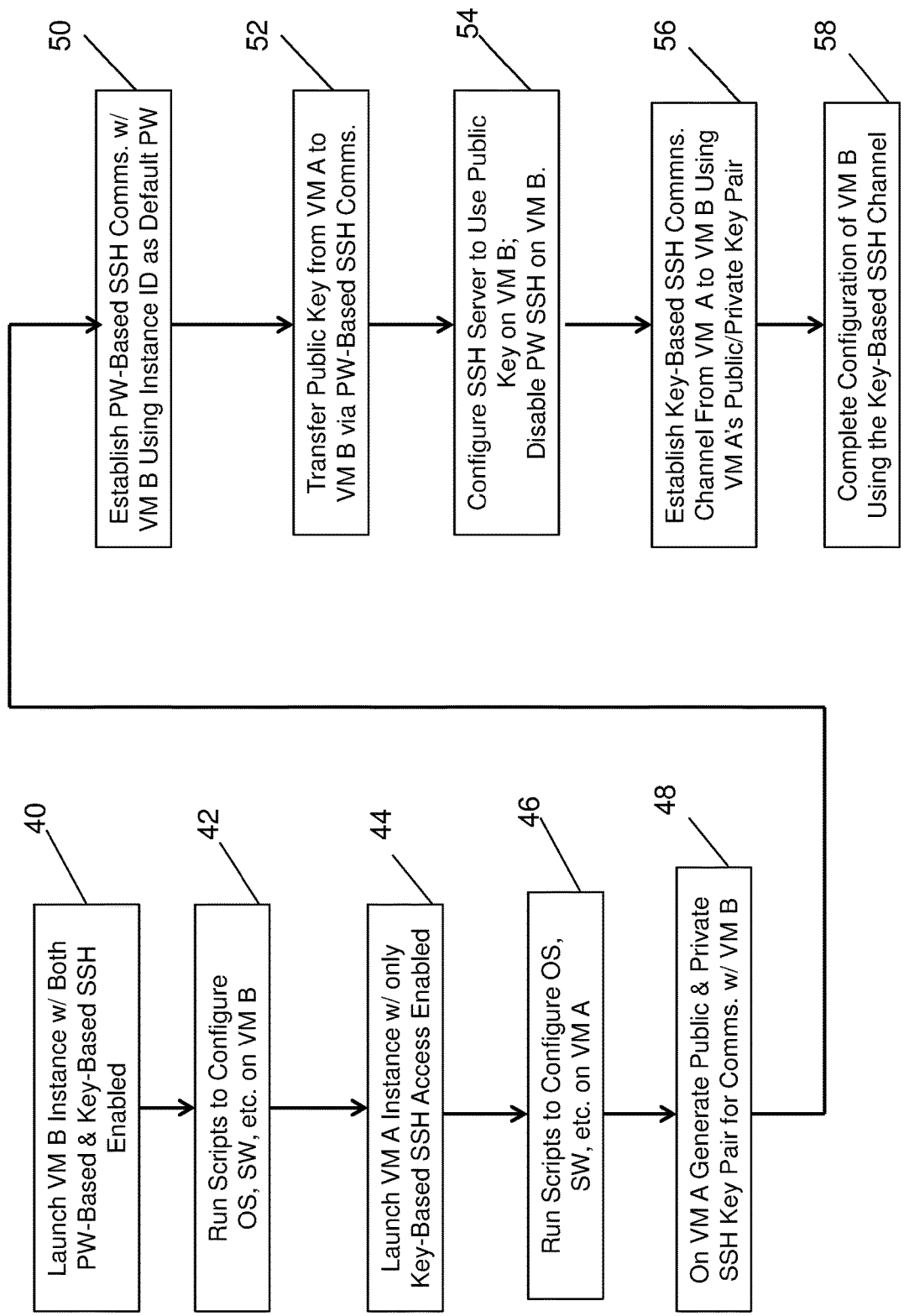
FIG. 4 is a block diagram illustrating the process of FIG. 3 in more detail.

FIG. 4 illustrates in more detail the process outlined in FIG. 3. As with FIG. 3, the process of FIG. 4 is initiated upon launching Product M, and it runs automatically and independently without user intervention. Some steps of the process may occur concurrently. As shown, at 40 VM B of Product M may be launched with both password-based SSH and key-based SSH enabled. (Password-based SSH may be enabled only temporarily, as explained above, using the instance ID of VM B assigned by Cloud-init as the default password.) At 42, scripts, such as Cloud-init, may be run to configure the operating system (OS), software (SW), etc., on VM B.

At 44, VM A is launched with only key-based SSH enabled, and at 46 scripts such as Cloud-init are run to configure the OS, SW, etc., on VM A. At 48, VM A generates a public/private key pair for key-based SSH with VM B. At 50, VM A establishes a password-based SSH communications channel with VM B using the instance ID assigned to VM B as the default password by the Cloud-init scripts. (VM A knows VM B's instance ID since the Cloud-init scripts also launched VM A.) At 52, VM A transfers its public key generated at 48 to VM B over the password-based SSH channel it established.

At 54, the SSH server is configured to use the public key on VM B, and password-based SSH access to VM B is disabled. At 56, key-based SSH from VM A to VM B is established using VM A's public/private key pair. And at, 58, additional configuration of VM B that requires the key-based SSH channel may be completed. The process then ends.

In an embodiment, the invention may comprise a computer product comprising executable instructions stored in physical non-transitory media that control a processor, such as a cloud server, to automatically perform the foregoing steps to launch and configure the virtual machines and to establish key-based SSH communications between them.

As can be seen from the foregoing, the invention enables key-based SSH communications to be established automatically and without user involvement between two virtual machines launched in a public cloud environment without communicating private keys over an insecure public network. As may also be appreciated, the invention may additionally have applicability to secure key exchange over public networks in other contexts.

Although the foregoing has been with reference to particular preferred embodiments, it will be apparent that the invention has greater utility and that changes to these embodiments may be made without departing from the principles of the invention, which are defined by the appended claims.

The invention claimed is:

1. A method of automatically and securely establishing key-based Secure shell (SSH) communications between processing entities over an insecure network in a public cloud environment without insecurely transferring a private key of a public/private key pair over the network, comprising:

launching instances of first and second virtual machines in said public cloud environment using an initiation template that automatically provisions and configures simultaneously each said first and second virtual machine, said launching comprising providing by said initiation template corresponding first and second instance identifiers for said first and second virtual machine instances, respectively;

enabling temporarily upon said launching a password-based SSH communications channel on the second virtual machine using said second instance identifier as a password, and enabling key-based SSH only on said first virtual machine;

generating by said first virtual machine a public/private key pair of the first virtual machine for key-based SSH communications with said second virtual machine;

transferring to said second virtual machine over said password-based SSH communications channel the public key of said public/private key pair of the first virtual machine, and configuring the second virtual machine to use the first virtual machine's public key as a public key of the second virtual machine; and establishing a key-based SSH communications channel between the first virtual machine and the second virtual machine using the public/private key pair of the first virtual machine.

2. The method of claim 1, wherein said steps of the method are performed by a processor automatically to completion without user involvement upon launching said instances of said first and second virtual machines.

3. The method of claim 1 further comprising disabling said password-based SSH communications channel with said second virtual machine upon said transferring of said pubic key of the first virtual machine.

4. The method of claim 1 further comprising generating by said second virtual machine another public/private key pair that is unique to said second virtual machine, transferring the public key of said other public/private key pair over said key-based SSH channel to said first virtual machine; and re-establishing said key-based SSH communications channel using said other public key for the second virtual machine.

5. The method of claim 1, wherein said initialization template that launches said first and second virtual machines comprises scripts to configure said first and second virtual machines based upon user data.

6. The method of claim 5, wherein said scripts configure operating systems and software on said virtual machines for operation of a software product.

7. The method of claim 1, wherein said method is performed in a cloud software vendor environment in response to a user selecting a software product, and wherein said first and second virtual machines are launched on a cloud server to run the selected software product.

8. Computer readable non-transitory media storing executable instructions for controlling a processor to perform a method of automatically and securely establishing key-based Secure shell (SSH) communications between processing entities over an insecure network in a public cloud environment without insecurely transferring a private key of a public/private key pair over the network, comprising:

launching instances of first and second virtual machines in said public cloud environment using an initiation template that automatically provisions and configures simultaneously each said first and second virtual machine, said launching comprising providing by said initiation template corresponding first and second instance identifiers for said first and second virtual machine instances, respectively;

enabling temporarily upon said launching a password-based SSH communications channel on the second virtual machine using said second instance identifier as a password, and enabling key-based SSH only on said first virtual machine;

generating by said first virtual machine a public/private key pair of the first virtual machine for key-based SSH communications with said second virtual machine;

transferring to said second virtual machine over said password-based SSH communications channel the public key of said public/private key pair of the first virtual machine, and configuring the second virtual machine to use the first virtual machines public key as a public key of the second virtual machine; and establishing key-based SSH communications between the first virtual machine and the second virtual machine using the public/private key pair of the first virtual machine.

9. Computer readable non-transitory media of claim 8, wherein the steps of said method are performed automatically to completion without user involvement upon launching said instances of said first and second virtual machines.

10. Computer readable non-transitory media of claim 8 further comprising disabling said password-based SSH communications channel with said second virtual machine upon said transferring of said pubic key of the first virtual machine.

11. Computer readable non-transitory media of claim 8 further comprising generating by said second virtual machine another public/private key pair that is unique to said second virtual machine, transferring the public key of said other public/private key pair over said key-based SSH channel to said first virtual machine; and re-establishing said key-based SSH communications channel using said other public key for the second virtual machine.

12. Computer readable non-transitory media of claim 8, wherein said initialization template that launches said first and second virtual machines comprises scripts to configure said first and second virtual machines based upon user data.

13. Computer readable non-transitory media of claim 12, wherein said scripts configure operating systems and software on said virtual machines for operation of a software product.

14. Computer readable non-transitory media of claim 8, wherein said method is performed in a cloud software vendor environment in response to a user selecting a software product, and wherein said first and second virtual machines are launched on a cloud server to run the selected software product.

* * * * *